(12) United States Patent
Takeda

(10) Patent No.: US 9,544,299 B2
(45) Date of Patent: Jan. 10, 2017

(54) INFORMATION PROCESSING APPARATUS, SERVER, METHOD FOR CONTROLLING THE SAME AND STORAGE MEDIUM

(71) Applicant: CANON KABUSHIKI KAISHA, Tokyo (JP)

(72) Inventor: Kyohei Takeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/166,153

(22) Filed: Jan. 28, 2014

(65) Prior Publication Data

US 2014/0258709 A1    Sep. 11, 2014

(30) Foreign Application Priority Data

Mar. 5, 2013    (JP) ................. 2013-043421

(51) Int. Cl.
*H04L 29/06* (2006.01)
*H04L 9/32* (2006.01)

(52) U.S. Cl.
CPC .......... *H04L 63/0823* (2013.01); *H04L 9/321* (2013.01); *H04L 9/3263* (2013.01)

(58) Field of Classification Search
CPC ..... H04L 63/0823; H04L 9/3263; H04L 9/321
USPC ....................................................... 713/156
See application file for complete search history.

(56) References Cited

U.S. PATENT DOCUMENTS

| 7,904,952 | B2 * | 3/2011 | Yeap | G06F 21/33 713/156 |
| 8,265,509 | B2 * | 9/2012 | Sekiya | 399/80 |
| 2002/0026427 | A1 * | 2/2002 | Kon | G06F 21/31 705/67 |
| 2007/0150727 | A1 * | 6/2007 | Miyazawa | G06F 21/604 713/158 |
| 2007/0234043 | A1 * | 10/2007 | Miyazawa | G06F 21/31 713/156 |

(Continued)

FOREIGN PATENT DOCUMENTS

| JP | 2003-188873 A | 7/2003 |
| JP | 2005-251156 A | 9/2005 |

(Continued)

OTHER PUBLICATIONS

Buchmann, "Towards a more Secure and Scalable Verifying PKI of eMRTD".*

(Continued)

*Primary Examiner* — Thanhnga B Truong
*Assistant Examiner* — Gregory Lane
(74) *Attorney, Agent, or Firm* — Fitzpatrick, Cella, Harper & Scinto

(57) ABSTRACT

An information processing apparatus for accessing a server via a network transmits an issuance request of a certificate including information unique to the information processing apparatus to a certificate authority, and receives the certificate transmitted by the certificate authority in response to the issuance request. The apparatus determines whether or not it is possible to access the server by comparing information unique to the information processing apparatus with the unique information included in the received certificate, and restricts, if it is determined that it is not possible to access the server, issuance of a connection request to the server.

10 Claims, 17 Drawing Sheets

(56) References Cited

U.S. PATENT DOCUMENTS

| | | | |
|---|---|---|---|
| 2007/0288680 A1* | 12/2007 | Tominaga | G06F 13/385 |
| | | | 710/313 |
| 2011/0055557 A1* | 3/2011 | Nakamura | 713/156 |
| 2011/0296172 A1* | 12/2011 | Fu | H04L 9/0825 |
| | | | 713/156 |
| 2011/0307642 A1 | 12/2011 | Yamasaki | |
| 2013/0227276 A1* | 8/2013 | Nakajima | 713/156 |

FOREIGN PATENT DOCUMENTS

| | | |
|---|---|---|
| JP | 2009-022338 A | 2/2009 |
| JP | 2009-086825 A | 4/2009 |
| JP | 2009-223387 A | 10/2009 |
| JP | 2009223387 A | 10/2009 |
| WO | 2007/094035 A1 | 8/2007 |

OTHER PUBLICATIONS

Japanese Office Action dated Nov. 7, 2016, issued in counterpart Japanese Patent Application No. 2013-043421.

\* cited by examiner

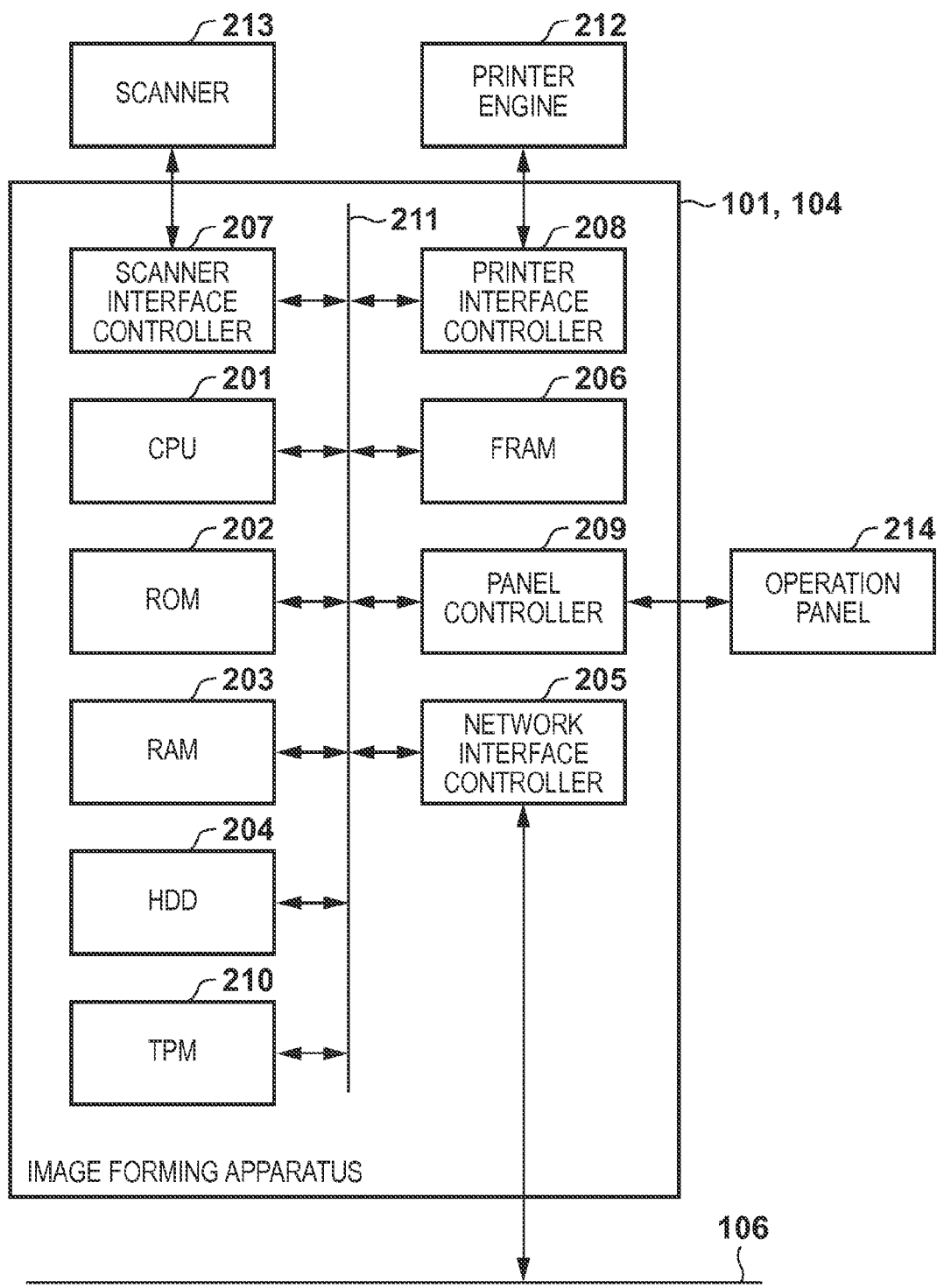

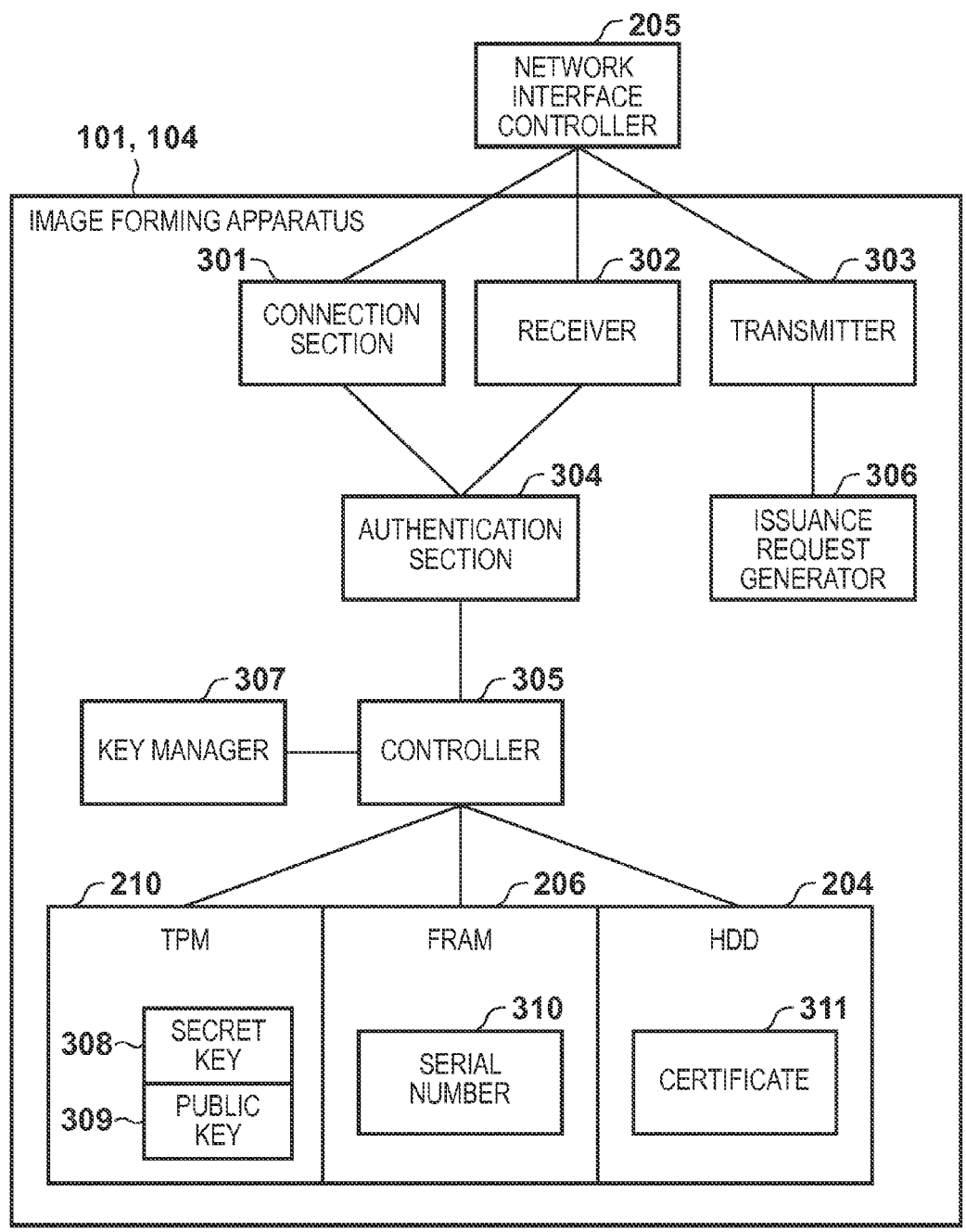

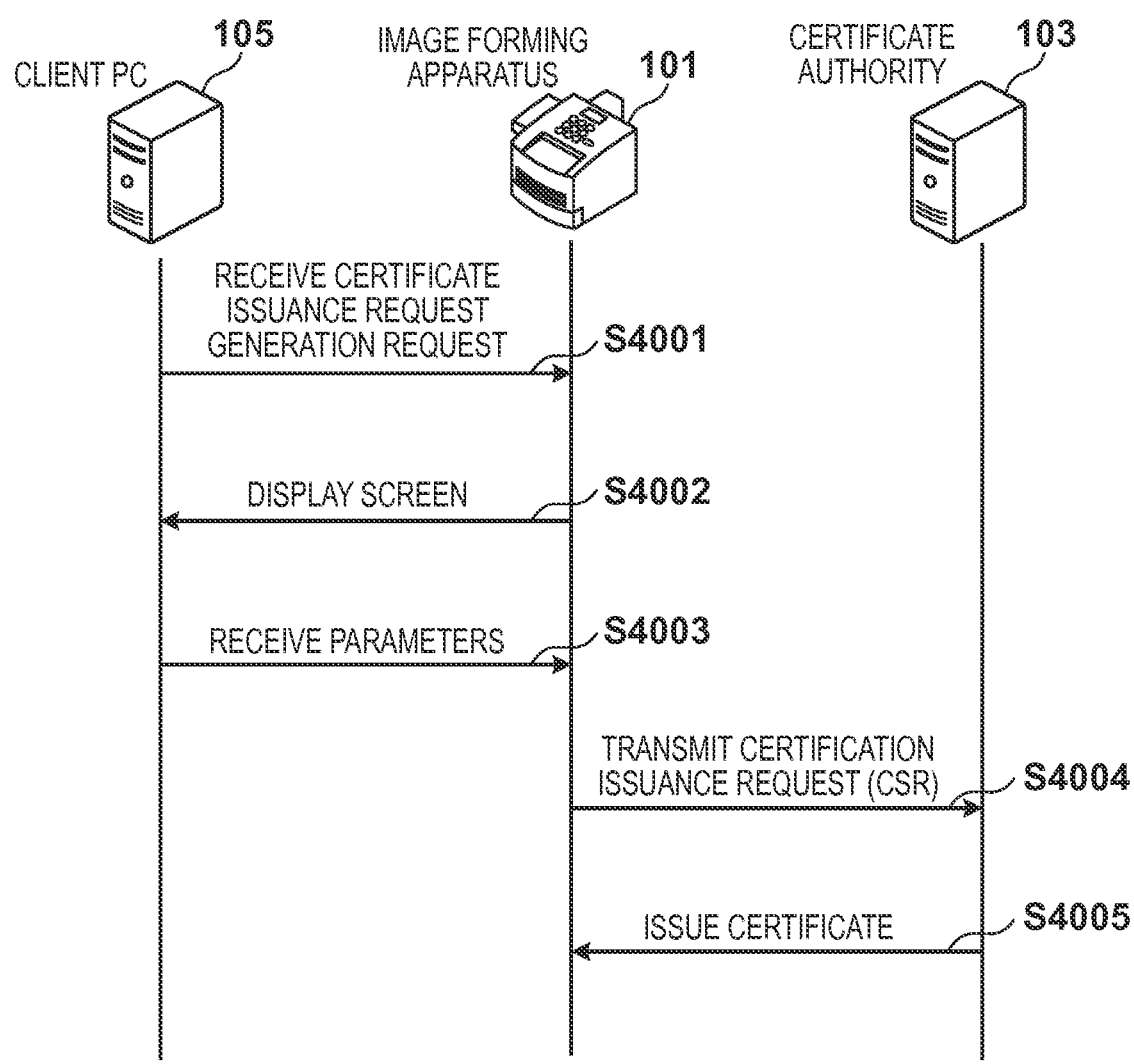

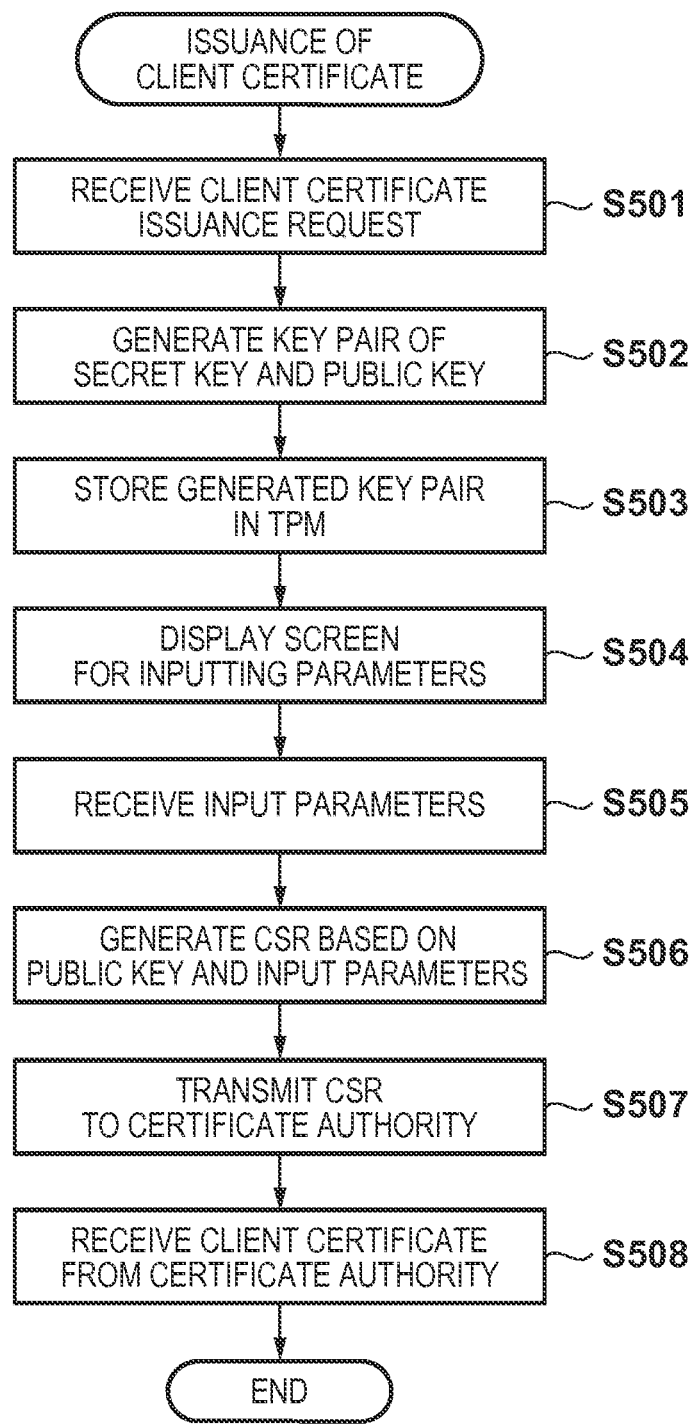

FIG. 6

```
CERTIFICATE ISSUANCE REQUEST GENERATION SCREEN

COUNTRY NAME   [           ]
      PREFECTURE NAME  [           ]
           CITY NAME   [           ]
     ORGANIZATION NAME [           ]
      DEPARTMENT NAME  [           ]
         COMMON NAME   [           ]
```

FIG. 7A

BASIC AREA INFORMATION

| ITEM | INPUT CONTENTS |
|---|---|
| COUNTRY NAME | JP |
| PREFECTURE NAME | Tokyo |
| CITY NAME | ota-ku |
| ORGANIZATION NAME | Abc Inc |
| DEPARTMENT NAME | Products Development |
| COMMON NAME | www.productdev.abc.co.jp |

FIG. 7B

EXTENDED AREA INFORMATION

| ITEM | INPUT CONTENTS |
|---|---|
| SERIAL NUMBER | 01234567 |

FIG. 8

| ITEM | INPUT CONTENTS | |
|---|---|---|
| VERSION | V3 | 811 |
| CERTIFICATE SERIAL NUMBER | 00112233445566778899 | 812 |
| SIGNATURE ALGORITHM | sha1RSA | 813 |
| ISSUER | Certificate Authority | 814 |
| START OF VALID PERIOD | 2012/06/01 | 815 |
| END OF VALID PERIOD | 2014/06/01 | 816 |
| SUBJECT | Abc Inc | 817 |
| EXTENDED INFORMATION | 01234567 | 818 |
| PUBLIC KEY ALGORITHM | RSA | 819 |
| PUBLIC KEY | aabbccddee | 820 |
| SIGNATURE GENERATION ALGORITHM | sha1RSA | 821 |
| SIGNATURE VALUE | zzxxyywwvv | 822 |

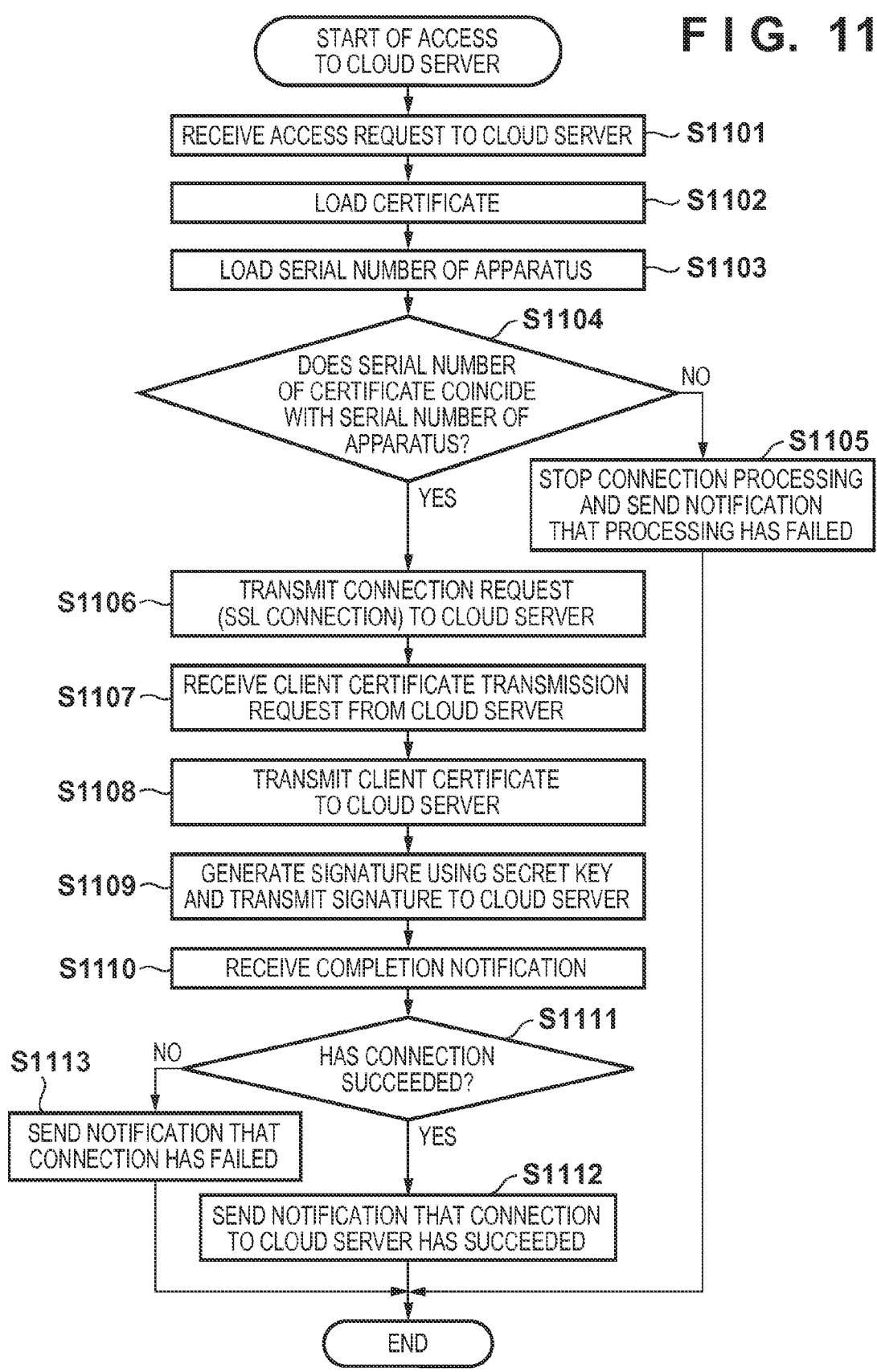

F I G. 12A
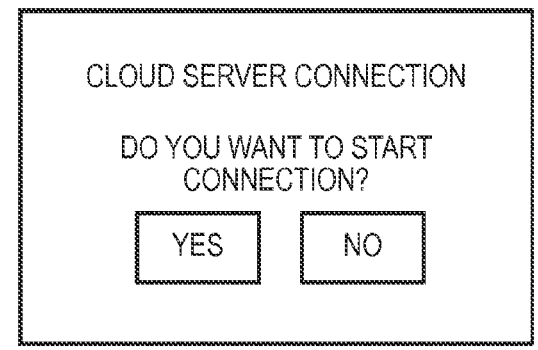
F I G. 12B
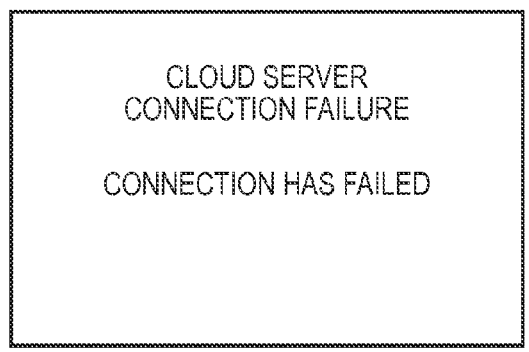
F I G. 12C
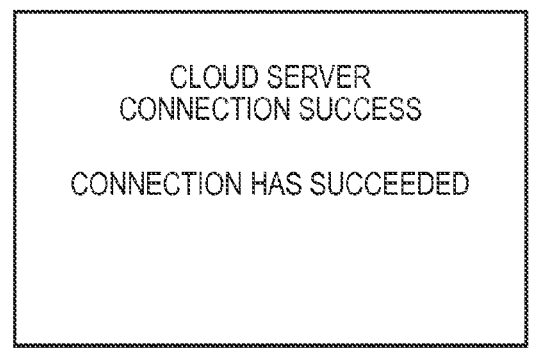
F I G. 13
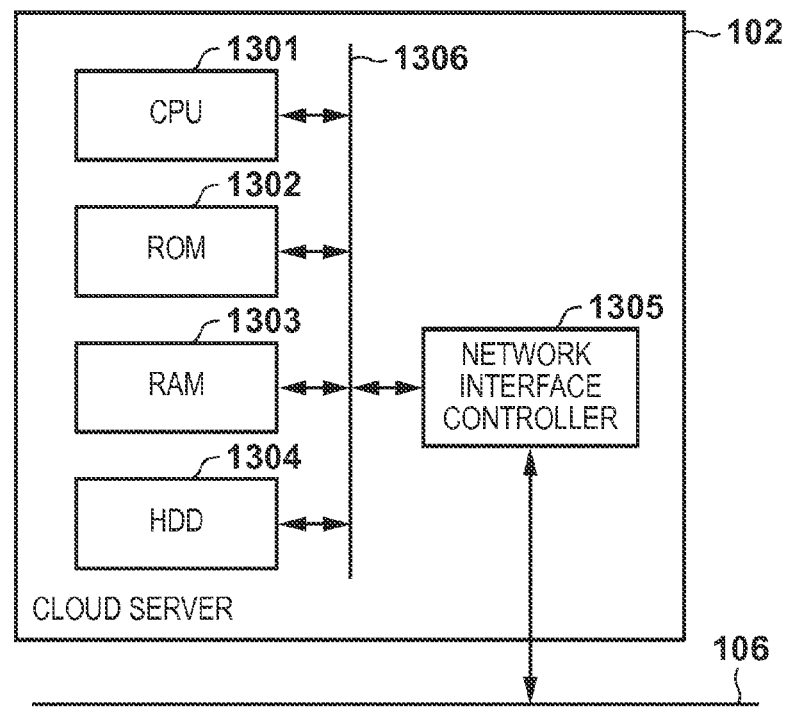

F I G. 14
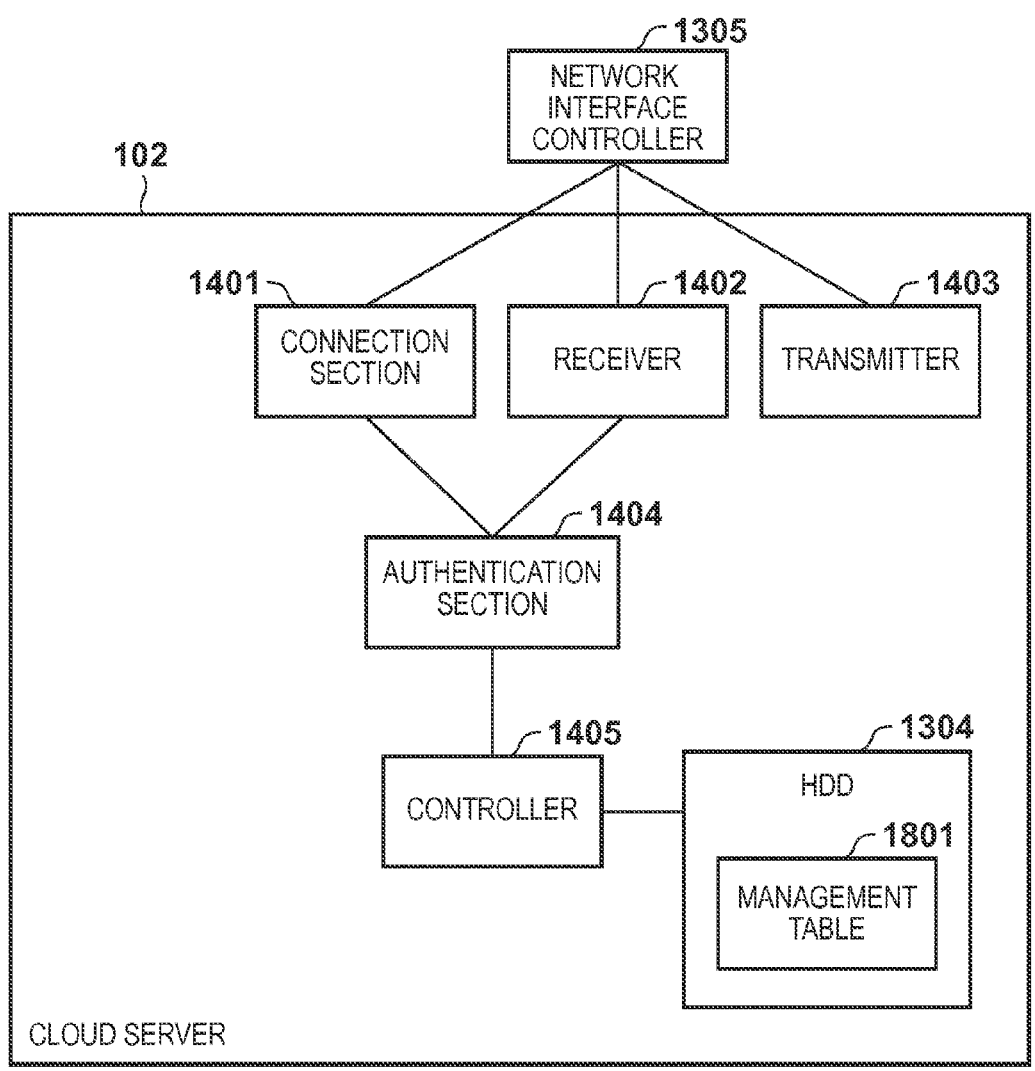

FIG. 15

CERTIFICATE ISSUANCE REQUEST GENERATION

COUNTRY NAME  
PREFECTURE NAME  
CITY NAME  
ORGANIZATION NAME  
DEPARTMENT NAME  
COMMON NAME  
CLOUD ID ─ 1501

FIG. 16A

BASIC AREA INFORMATION

| ITEM | INPUT CONTENTS |
|---|---|
| COUNTRY NAME | JP |
| PREFECTURE NAME | Tokyo |
| CITY NAME | ota-ku |
| ORGANIZATION NAME | Abc Inc |
| DEPARTMENT NAME | Products Development |
| COMMON NAME | www.productdev.abc.co.jp |

FIG. 16B

EXTENDED AREA INFORMATION

| ITEM | INPUT CONTENTS |
|---|---|
| SERIAL NUMBER | 01234567 |
| CLOUD ID | C01234 |

| ITEM | INPUT CONTENTS | |
|---|---|---|
| VERSION | V3 | |
| CERTIFICATE SERIAL NUMBER | 00112233445566778899 | |
| SIGNATURE ALGORITHM | sha1RSA | |
| ISSUER | Certificate Authority | |
| START OF VALID PERIOD | 2012/06/01 | |
| END OF VALID PERIOD | 2014/06/01 | |
| SUBJECT | Abc Inc | |
| EXTENDED INFORMATION | 01234567 | |
| EXTENDED INFORMATION (CLOUD ID) | C01234 | ~1701 |
| PUBLIC KEY ALGORITHM | RSA | |
| PUBLIC KEY | aabbccddee | |
| SIGNATURE GENERATION ALGORITHM | sha1RSA | |
| SIGNATURE VALUE | zzxxyywwvv | |

FIG. 18

| CLOUD ID | SERIAL NUMBER | PASSWORD |
|---|---|---|
| C01234 | 01234567 | xxxxxxx |
| C12345 | 12345678 | xxxxxxx |
| C23456 | 23456789 | xxxxxxx |

INFORMATION PROCESSING APPARATUS, SERVER, METHOD FOR CONTROLLING THE SAME AND STORAGE MEDIUM

BACKGROUND OF THE INVENTION

Field of the Invention

The present invention relates to a technique of preventing spoofing.

Description of the Related Art

In recent years, the number of systems which can provide various cloud-based services is increasing, and the number of users of such services tends to increase year by year. When using such cloud service, however, the users are most concerned about a security risk. The fact that a cloud server resides on the Internet to be used by anyone from anywhere is the biggest advantage and is also a problem at the same time. In general account management on the cloud server, the cloud server holds the user IDs and passwords of registered users, and determines whether to allow connection with the user of a client by performing user authentication when the client accesses the cloud server. In this case, if a user ID and password are stolen, a malicious third party can spoof the user to access the cloud server, causing personal information leakage.

To solve this problem, a device authentication technique has been provided. This technique prevents spoofing by identifying a device which accesses a cloud server when the device accesses the server to limit connection to that from a specific device. Japanese Patent Laid-Open No. 2009-223387 discloses a technique of rejecting authentication of apparatuses except for a specific apparatus using hardware dedicated to authentication. This technique, however, has a problem associated with cost since dedicated hardware is necessary. Furthermore, as a method of realizing device authentication, a method of performing client authentication using a client certificate and a key pair unique to a device is plausible.

However, there may be a risk even if client authentication is performed using a client certificate and a key pair unique to a device. For example, when both a client certificate and a key pair unique to a device, which are used in authentication, are stolen and attached to another device, the device can undesirably access the cloud server.

SUMMARY OF THE INVENTION

An aspect of the present invention is to eliminate the above-mentioned problems with conventional technology.

A feature of the present invention is to provide a technique of, even if a client certificate and keys, which are used in authentication, are stolen, disabling authentication using the client certificate and keys in another information processing.

The present invention in its first aspect provides an information processing apparatus for accessing a server via a network, comprising: a transmission unit configured to transmit an issuance request of a certificate including information unique to the information processing apparatus to a certificate authority; a reception unit configured to receive the certificate transmitted by the certificate authority in response to the issuance request; a determination unit configured to determine whether or not it is possible to access the server by comparing information unique to the information processing apparatus with the information included in the certificate; and a restriction unit configured to restrict, if the determination unit determines that it is not possible to access the server, issuance of a connection request to the server.

The present invention in its second aspect provides a server accessed from an information processing apparatus via a network, comprising: a reception unit configured to receive encrypted information including at least parameters unique to the information processing apparatus from the information processing apparatus; a decryption unit configured to decrypt the information received by the reception unit; an authentication unit configured to authenticate the information processing apparatus by comparing the parameters included in the information decrypted by the decryption unit with parameters stored in the server; and a control unit configured to control to accept access from the information processing apparatus if authentication by the authentication unit has succeeded, and to reject access from the information processing apparatus if authentication by the authentication unit has failed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the hardware configuration of the image forming apparatus according to the first embodiment;

FIG. 3 is a functional block diagram showing the software configuration of the image forming apparatus according to the first embodiment;

FIG. 4 is a sequence chart for explaining a client certificate issuance procedure in the network system according to the first embodiment of the present invention;

FIG. 5 is a flowchart for describing a client certificate issuance procedure executed by the image forming apparatus according to the first embodiment;

FIG. 6 depicts a view showing a screen example for generating a certificate issuance request according to the first embodiment;

FIG. 7A depicts a view illustrating an example of parameters input through the screen shown in FIG. 6;

FIG. 7B depicts a view illustrating an example of a serial number stored in the image forming apparatus;

FIG. 8 depicts a view illustrating an example of a generated client certificate;

FIG. 11 is a flowchart for describing a processing procedure executed by the image forming apparatus 104;

FIGS. 12A to 12C depict views each for explaining a display example displayed on the operation panel of the image forming apparatus in connection to the cloud server;

FIG. 13 is a block diagram showing the hardware configuration of a cloud server;

FIG. 14 is a functional block diagram showing the software configuration of the cloud server according to the second embodiment of the present invention;

FIG. 15 depicts a view showing a screen example for generating a certificate issuance request according to the second embodiment;

FIG. 16A depicts a view illustrating an example of parameters input through the screen shown in FIG. 15;

FIG. 16B depicts a view illustrating an example of a serial number and a cloud ID stored in an image forming apparatus according to the second embodiment;

FIG. 17 depicts a view illustrating an example of a generated client certificate according to the second embodiment;

FIG. 18 depicts a view illustrating an example of a management table according to the second embodiment;

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention. Note that in the embodiments, an image forming apparatus will be exemplified as an information processing apparatus according to the present invention.

[First Embodiment]

Figure 1:
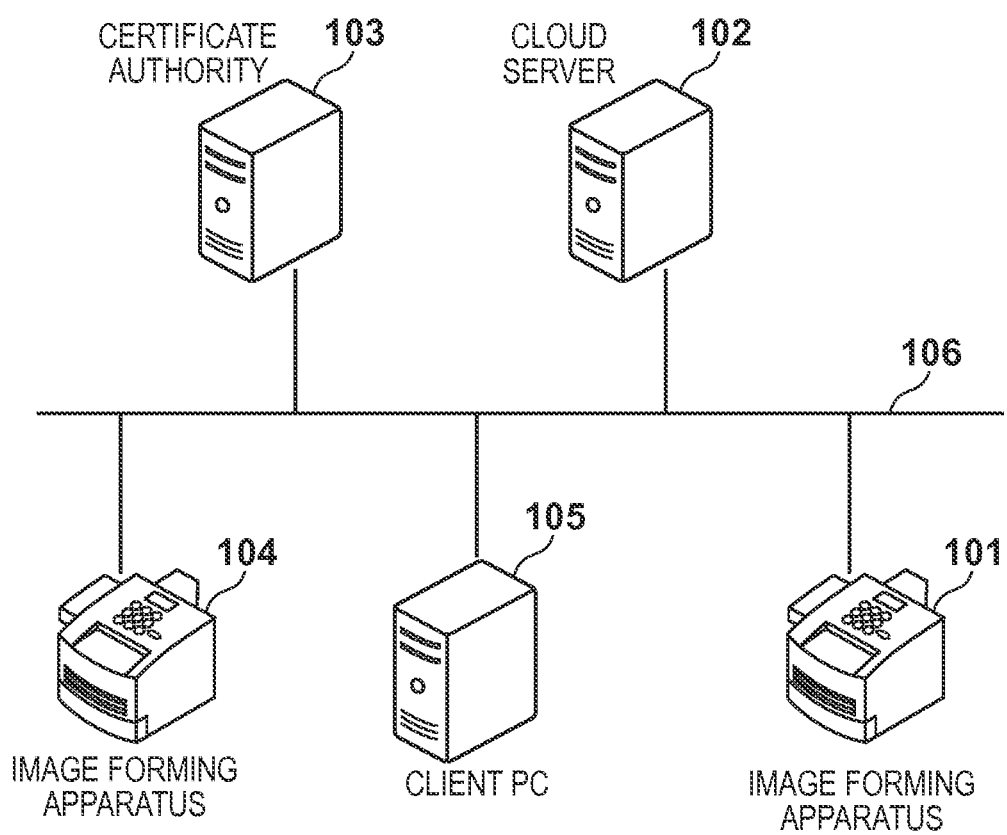
FIG. 1 depicts a view showing the configuration of a network system including an image forming apparatus according to the first embodiment of the present invention.

FIG. 1 depicts a view showing the configuration of a network system including an image forming apparatus according to the first embodiment of the present invention.

In this network system, an image forming apparatus 101, a cloud server 102, a certificate authority 103, an image forming apparatus 104, and a client PC 105 are communicably connected to each other via a network 106. The cloud server 102 provides a service to the image forming apparatuses 101 and 104 and the client PC 105. In response to a request from a client, the certificate authority 103 issues a client certificate for accessing the cloud server 102.

FIG. 2 is a block diagram showing the hardware configuration of the image forming apparatus 101 according to the first embodiment. Note that the hardware configuration of the image forming apparatus 104 is the same as that of the apparatus 101 and a description thereof will be omitted.

A CPU 201 controls the overall image forming apparatus 101 by executing a software program for controlling the operation of the apparatus. A ROM 202 is a read only memory, and stores the boot program, and fixed parameters and the like of the image forming apparatus 101. A RAM 203 is a random access memory, and is used to store programs and temporary data when the CPU 201 controls the image forming apparatus 101. An HDD 204 is a hard disk drive, and is used to store various data such as an OS, control program, and print data. The HDD 204 is mounted to be detachable from the image forming apparatus 101. A program to be executed by the CPU 201 has been installed in the HDD 204. Upon power-on of the apparatus 101, the CPU 201 executes the boot program stored in the ROM 202, and reads out the OS and program from the HDD 204 to deploy them on the RAM 203. In this way, the image forming apparatus 101 is activated when the CPU 201 executes the program deployed on the RAM 203, thereby executing various control processes (to be described later).

A network interface controller 205 controls transmission/reception of data to/from the network 106. An FRAM (Ferroelectric Random Access Memory) 206 is a nonvolatile memory, and saves various setting values of the image forming apparatus 101 and the like, for example, a serial number as an identifier unique to the apparatus 101. A scanner interface controller 207 controls the operation of a scanner 213. A printer interface controller 208 controls the operation of a printer engine 212. A panel controller 209 controls an operation panel 214 to display various kinds of information and receive an instruction input by the user. A TPM (Trusted Platform Module) 210 is a security chip having a tamper resistance, holds a key pair of a public key and secret key inside, and is mounted to be detachable from the image forming apparatus 101. A bus 211 connects the CPU 201 to each of the above-described units, and transmits a control signal, a data signal, and the like from the CPU 201 to each unit.

FIG. 3 is a functional block diagram showing the software configuration of the image forming apparatus 101 according to the first embodiment. Note that the software configuration of the image forming apparatus 104 is the same that of the apparatus 101 and a description thereof will be omitted.

A connection section 301 connects to a service on the network 106 via the network interface controller 205. A receiver 302 receives data from the service on the network 106 via the network interface controller 205. A transmitter 303 transmits data to the service on the network 106 via the network interface controller 205. An authentication section 304 compares the information of a serial number held in a certificate 311 in the HDD 204 with a serial number 310 in the FRAM 206. A controller 305 manages the information of the HDD 204, FRAM 206, and TPM 210. An issuance request generator 306 generates a request necessary for requesting the certificate authority 103 to issue a client certificate. A key manager 307 generates a key pair of a secret key 308 and public key 309, and performs encryption and decrypting using the keys. Programs for implementing the connection section 301, receiver 302, transmitter 303, authentication section 304, controller 305, issuance request generator 306, and key manager 307 are deployed from the HDD 204 onto the RAM 203, and executed under the control of the CPU 201, as described above.

FIG. 4 is a sequence chart for explaining a client certificate issuance procedure in the network system according to the first embodiment of the present invention. FIG. 5 is a flowchart for describing a client certificate issuance procedure executed by the image forming apparatus 101 according to the first embodiment. Note that a program for executing the processing shown in FIG. 5 is deployed on the RAM 203 upon execution, and executed under the control of the CPU 201.

In order for the certificate authority 103 to issue a client certificate, an apparatus (to be referred to as a subject hereinafter) which requests issuance of a certificate needs to transmit data of a certificate issuance request format called a CSR (Certificate Signing Request). This causes the certificate authority 103 to issue a client certificate based on contents described in the CSR. For the format of the CSR, a standard PKCS#10 is used. The CSR includes the information of the subject containing public key information of the subject.

Referring to FIG. 4, the image forming apparatus 101 receives a certificate issuance request (CSR) generation request from the client PC 105 in step S4001. In step S4002, the image forming apparatus 101 transmits, to the client PC 105, screen data for displaying a screen (FIG. 6) for inputting parameters necessary for a certificate issuance request. To send a certificate issuance request (CSR) generation request, the web server function of the image forming apparatus 101 may be used to make access through the browser screen of the client PC 105. Alternatively, the user (not shown) may input the parameters through the operation panel 214 of the image forming apparatus 101. In the first embodiment, a case in which the parameters are input through the browser screen of the client PC 105 based on the screen information will be described.

When parameters are input in the client PC 105, the image forming apparatus 101 receives the parameters input in the client PC 105 from the client PC 105 in step S4003. Upon receiving the input parameters, the image forming apparatus 101 generates a CSR based on the generated public key 309 and the input parameters, and transmits the generated CSR to the certificate authority 103 in step S4004. With this processing, in step S4005, the certificate authority 103 issues a client certificate based on the contents of the CSR and the image forming apparatus 101 receives the client certificate.

The operation of the image forming apparatus 101 in this case will be described with reference to the flowchart shown in FIG. 5.

FIG. 5 is a flowchart for describing a client certificate issuance procedure executed by the image forming apparatus 101 according to the first embodiment. Note that a program for executing the processing is stored in the HDD 204, and deployed on the RAM 203 to be executed under the control of the CPU 201. In this example, however, a description will be provided according to the software configuration shown in FIG. 3.

In step S501, the receiver 302 of the image forming apparatus 101 receives a certificate issuance request (CSR) generation request from the client PC 105. The process advances to step S502, and the key manager 307 generates a key pair of a secret key 308 and public key 309. In step S503, the controller 305 stores the generated key pair in the TPM 210. Although a key pair is generated after receiving a certificate issuance request in the first embodiment, a key pair to be used may be generated in advance. Furthermore, the key pair of the secret key 308 and public key 309 is held in the TPM 210 in the first embodiment but may be held in the HDD 204. Note that, in this case, the HDD 204 has no tamper resistance unlike the TPM 210 and thus the confidentiality reduces.

The process advances to step S504, and the issuance request generator 306 displays a screen (FIG. 6) for inputting parameters necessary for a certificate issuance request. In this example, the parameters are input through the browser screen of the client PC 105.

FIG. 6 depicts a view showing a screen example for generating a certificate issuance request according to the first embodiment.

This screen includes fields in which a country name, prefecture name, city name, organization name, department name, and common name necessary to generate a CSR are input.

FIG. 7A depicts a view illustrating an example of the parameters input through the screen shown in FIG. 6.

The CSR includes two areas, that is, a basic area and an extended area. It is possible to store information defined by the user in the extended area. In this example, as shown in FIG. 7B, the serial number 310 stored in the FRAM 206 of the image forming apparatus 101 is set in the extended area.

Although an item for inputting the serial number 310 is not provided as an input field in FIG. 6, an input field may be provided to prompt the user to input the serial number 310. In the first embodiment, an input item is not provided, and the issuance request generator 306 acquires the serial number 310 of the image forming apparatus 101 stored in the FRAM 206 via the controller 305, and sets the serial number 310 in the extended area at the time of creation of the CSR.

Upon completion of the input operation in the client PC 105, the image forming apparatus 101 receives the input parameters from the client PC 105 in step S505. The process then advances to step S506, and the image forming apparatus 101 generates a CSR based on the public key 309 generated in step S502 and the parameters received in step S505. After that, the process advances to step S507, and the transmitter 303 transmits the CSR generated in step S506 to the certificate authority 103. The certificate authority 103 issues a client certificate based on the contents of the CSR, and the receiver 302 of the image forming apparatus 101 receives the certificate in step S508. The controller 305 stores the thus received client certificate in the HDD 204.

FIG. 8 depicts a view illustrating an example of the thus generated client certificate.

The format of the client certificate complies with the X509 standard. A version 811 indicates the version of the certificate. In the first embodiment, since the extended area of the certificate is used, the version is V3. A certificate serial number 812 indicates the number for uniquely identifying the certificate assigned by the certificate authority 103. A signature algorithm 813 indicates an algorithm used when the certificate authority 103 signs the certificate. An issuer 814 indicates the name of the certificate authority 103 which has issued the certificate. A "start of valid period" 815 and an "end of valid period" 816 indicate the start and end of the valid period of the certificate, respectively. A subject 817 indicates the name of the subject of the certificate. Extended information 818 is information set in the extended area, in which the serial number 310 of the image forming apparatus 101 has been set. A public key algorithm 819 indicates the public key algorithm of the subject. A public key 820 indicates the public key of the subject, in which the public key 309 set upon issuance has been set. The items 811 to 820 are signed according to an algorithm (sha1RSA in this example) set in a signature algorithm 821, thereby generating a signature value 822. This prevents the certification from being altered. This is because when an attacker tries to alter the specific information of the certificate and abuse it, a value different from the signature value 822 stored in the certificate is included at the time of verification of the certificate.

Figure 9:
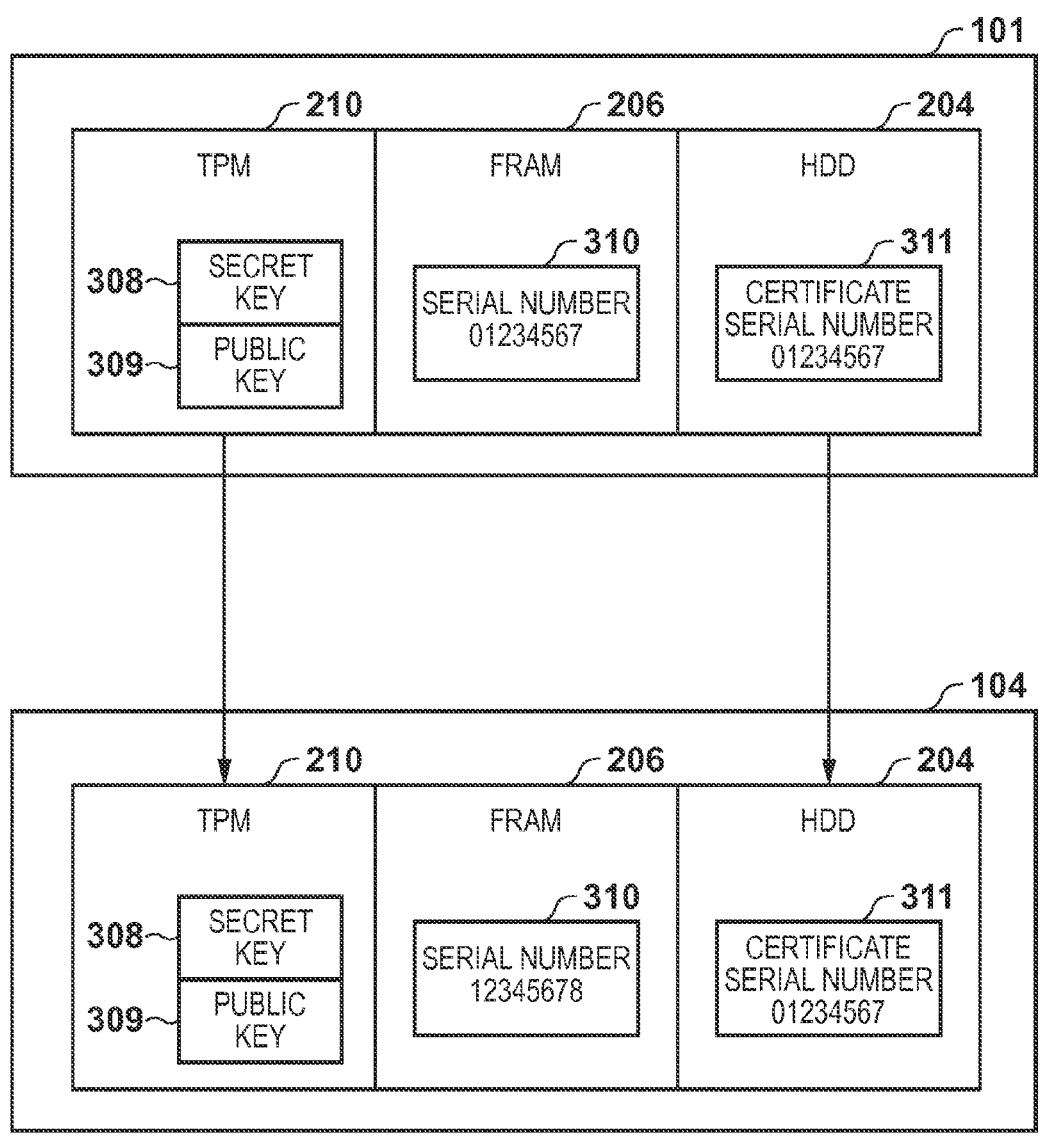
FIG. 9 is a block diagram for explaining a configuration when a malicious attacker detaches the HDD and TPM of an image forming apparatus 101 according to the first embodiment from the image forming apparatus 101, and attaches them to another image forming apparatus 104.

FIG. 9 is a block diagram for explaining a configuration when a malicious attacker detaches the HDD 204 and TPM 210 of the image forming apparatus 101 according to the first embodiment from the image forming apparatus 101, and attaches them to the other image forming apparatus 104. As described above, in the first embodiment, since the HDD 204 and the TPM 210 are configured to be detachable from the image forming apparatus 101, such situation is assumed to occur.

The HDD 204 of the image forming apparatus 101 stores the certificate 311, and the TPM 210 of the image forming apparatus 101 stores the secret key 308 and public key 309. The certificate 311 has been issued according to the certificate issuance procedure described with reference to FIG. 4, in which the serial number "01234567" 310 stored in the FRAM 206 of the image forming apparatus 101 has been set in the extended information 818 of the certificate 311. The public key 309 stored in the TPM 210 has been set as the public key 820 of the certificate 311, and the secret key 308 corresponds to the public key 309.

Note that the serial number 310 stored in the FRAM 206 of the image forming apparatus 101 is different from that stored in an FRAM 206 of the image forming apparatus 104. That is, the device serial number of the image forming apparatus 101 is "01234567" while the device serial number of the image forming apparatus 104 is "12345678".

Figure 10:
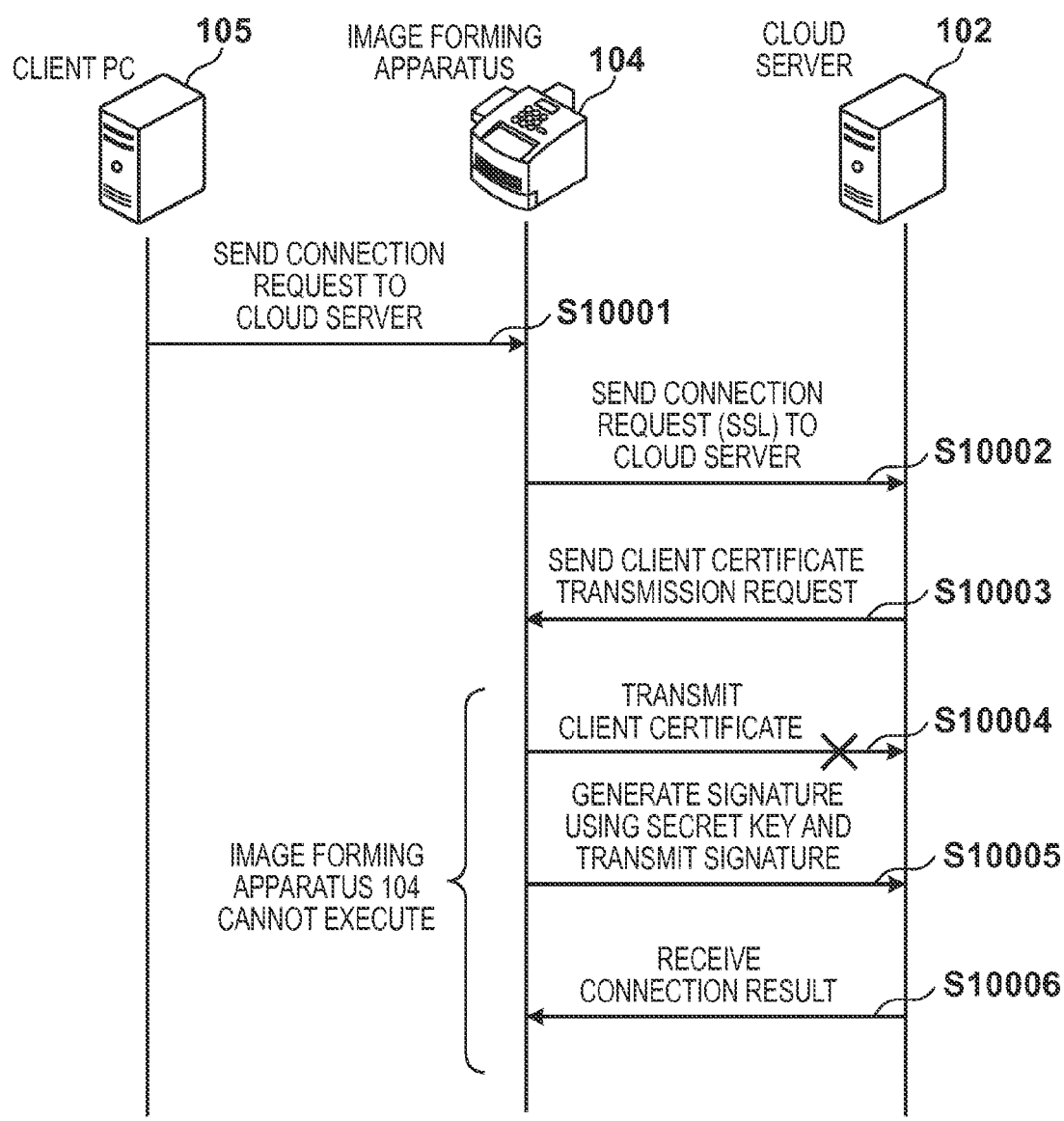
FIG. 10 is a sequence chart for explaining a procedure when the image forming apparatus 104 shown in FIG. 9 connects to a cloud server in the network system according to the first embodiment of the present invention.

FIG. 10 is a sequence chart for explaining a procedure when the image forming apparatus 104 shown in FIG. 9 connects to the cloud server 102 in the network system according to the first embodiment of the present invention.

FIG. 11 is a flowchart for describing a processing procedure executed by the image forming apparatus 104 in this case.

Referring to FIG. 10, to connect to the cloud server 102, the web function of the image forming apparatus 104 may be used to make access through the browser screen of the client PC 105 in step S10001. The user (not shown) may perform an input operation through the operation panel 214 of the image forming apparatus 104. In the first embodiment, a case in which the user performs an input operation through the browser screen of the client PC 105 will be explained. Upon receiving a connection request to the cloud server in step S10001, the connection section 301 issues a connection request (SSL connection) to the cloud server 102 in step S10002. In step S10003, the cloud server 102 sends a client certificate transmission request. In step S10004, the image forming apparatus 104 reads out the certificate 311 from the HDD 204, and transmits the readout certificate 311 to the cloud server 102. Since, however, the serial number 310 of the image forming apparatus 104 is different from that of the image forming apparatus 101, the image forming apparatus 104 cannot issue a client certificate for the cloud server 102.

In step S10005, the image forming apparatus 104 reads out the secret key 308 from the TPM 210, and generates a signature using the key to transmit it to the cloud server 102. In step S10006, the image forming apparatus 104 receives the connection result from the cloud server 102.

In FIG. 10, since the image forming apparatus 104 cannot issue a client certificate for the cloud server 102, "connection failure" is sent from the cloud server 102 as the connection result in step S10006.

The processing of the image forming apparatus 104 will be described in detail with reference to the flowchart shown in FIG. 11. FIGS. 12A to 12C depict views each for explaining a display example displayed on the operation panel 214 of the image forming apparatus 104 in connection to the cloud server 102.

In step S1101, the apparatus 104 receives a connection request to the cloud server 102 from the client PC 105. As shown in FIG. 12A, a connection request screen is displayed on the operation panel 214 of the image forming apparatus 104 at this time. When a YES button for starting connection is selected, a connection request is issued. The process advances to step S1102, and the controller 305 loads the certificate 311 from the HDD 204. In step S1103, the controller 305 loads the serial number 310 from the FRAM 206. The process then advances to step S1104. Before connecting to the cloud server 102, the authentication section 304 determines whether the serial number (extended information 818) recorded in the certificate 311 of the HDD 204 coincides with the serial number 310 of the image forming apparatus 104 read out from the FRAM 206. If the serial numbers do not coincide with each other, the process advances to step S1105 to stop the connection processing without issuing a connection request to the server (by restricting issuance of a connection request to the server). After that, as shown in FIG. 12B, a screen indicating a connection failure is displayed on the operation panel 214 of the image forming apparatus 104, thereby terminating the process.

In the case of the image forming apparatus 104, since the serial number (extended information 818) recorded in the client certificate 311 is different from the serial number 310 stored in the FRAM 206 of the image forming apparatus 104, the connection processing is stopped in step S1105.

On the other hand, if the serial number (extended information 818) recorded in the certificate 311 coincides with the serial number 310 read out from the FRAM 206, the process advances to step S1106, and the connection section 301 issues a connection request (SSL connection) to the cloud server 102. When the connection request is thus transmitted to the cloud server 102, it sends a client certificate transmission request. In step S1107, the receiver 302 receives the request. The process advances to step S1108, in which the controller 305 reads out the certificate 311 from the HDD 204 and the transmitter 303 transmits the certificate to the cloud server 102. The process advances to step S1109, in which the controller 305 reads out the secret key 308 from the TPM 210 and generates a signature using the secret key, and the transmitter 303 transmits the generated signature to the cloud server 102. The reason why a signature is generated using the secret key 308 and transmitted is that the client certificate transmitted to the cloud server 102 includes the corresponding public key 309 and the cloud server 102 verifies the transmitted signature using the public key 309. After that, the process advances to step S1110, and the receiver 302 receives the connection result from the cloud server 102. In step S1111, whether connection has succeeded or failed is determined. If connection has succeeded, the process advances to step S1112 to display a message indicating connection success, as shown in FIG. 12C. If connection has failed, the process advances to step S1113 to display a message indicating a connection failure, as shown in FIG. 12B.

As described above, according to the first embodiment, a client certificate including information (serial number) unique to a device is issued, and the information unique to the device of the client certificate is compared with information unique to the device of the image forming apparatus when connecting to the server. This makes it possible to restrict connection of an apparatus, except for the apparatus which has issued the client certificate, with the server using the client certificate. This can prevent another apparatus from accessing the cloud server using the client certificate even if the client certificate and the key pair are stolen.

Note that the device serial number may be, for example, a MAC address, an IP address, or the like.

[Second Embodiment]

The second embodiment of the present invention will be described next. In the above-described first embodiment, the image forming apparatus performs processing of determining whether connection is possible by comparing the serial numbers in connection. The second embodiment is different from the first embodiment in that a cloud server 102 also performs similar processing. Note that the configuration of a system and the configuration of an image forming apparatus according to the second embodiment are the same as those in the above-described first embodiment and a description thereof will be omitted.

FIG. 13 is a block diagram showing the hardware configuration of the cloud server 102 according to the second embodiment of the present invention.

A CPU 1301 controls the overall server by executing a software program of the cloud server 102. A ROM 1302 stores a boot program, fixed parameters, and the like. A RAM 1303 is used to store temporary data and the like when the CPU 1301 controls the operation of the server. An HDD 1304 is used to store OS, program and various data such as print data. A network interface controller 1305 controls transmission/reception of data to/from a network 106. The CPU 1301, ROM 1302, RAM 1303, HDD 1304, and network interface controller 1305 are connected to a bus 1306, via which a control signal and data signal from the CPU 1301 are transmitted/received. A program to be executed by the CPU 1301 has been installed in the HDD 1304. Upon power-on of the server, the CPU 1301 executes the boot program stored in the ROM 1302, and reads out an OS and program from the HDD 1304 to deploy them on the RAM 1303. In this way, the server 102 is activated when the CPU 1301 executes the program deployed on the RAM 1303, thereby executing various control processes (to be described later).

FIG. 14 is a functional block diagram showing the software configuration of the cloud server 102 according to the second embodiment of the present invention.

A connection section 1401 connects to a client on the network 106 via the network interface controller 1305. A receiver 1402 receives data from the client on the network 106 via the network interface controller 1305. A transmitter 1403 transmits data to the client on the network 106 via the network interface controller 1305. An authentication section 1404 compares the information received by the receiver 1402 with information in a management table 1801 (FIG. 18) in the HDD 1304. A controller 1405 manages the information in the HDD 1304.

The connection section 1401, receiver 1402, transmitter 1403, authentication section 1404, and controller 1405 are implemented when the CPU 1301 executes the program deployed from the HDD 1304 onto the RAM 1303.

In the second embodiment, the difference from the first embodiment will be explained.

The processing procedure in steps S4001 to S4005 of the client certificate issuance processing shown in FIG. 4 described in the first embodiment remains unchanged but the input parameters received in step S4003 are expanded.

FIG. 15 depicts a view showing a screen example for generating a certificate issuance request according to the second embodiment.

In this example, a parameter of a cloud ID 1501 is added to the parameters shown in FIG. 6. This parameter indicates the ID of the cloud server for using a service provided by the cloud server 102. An example of the service is a print service which prints data saved in the cloud server 102. A client needs to make registration in advance to use such service, and a cloud ID and password are issued upon registration.

In the second embodiment, since the parameter of the cloud ID 1501 is added, a CSR generated in step S506 of FIG. 5 is different.

FIG. 16A depicts a view illustrating an example of the parameters input through the screen shown in FIG. 15. FIG. 16B depicts a view illustrating an example of a serial number and cloud ID stored in an image forming apparatus 101 according to the second embodiment.

Referring to FIG. 16B, a cloud ID "C01234" 1601 is added as compared with FIG. 7B. Since a CSR is different, a client certificate issued in step S4005 additionally includes a client ID 1701, as shown in FIG. 17, as compared with the client certificate in FIG. 8.

FIG. 17 depicts a view illustrating an example of the generated client certificate according to the second embodiment.

FIG. 18 depicts a view illustrating an example of the management table 1801 according to the second embodiment.

A certificate authority 103 transmits the combination of an issued cloud ID and serial number to the cloud server 102. As shown in FIG. 18, the cloud server 102 holds, in the HDD 1304, the management table 1801 including combinations of cloud IDs, serial numbers, and passwords. The management table 1801 is generated upon registration of a cloud service. When the receiver 1402 receives the cloud ID and serial number from the certificate authority 103, the information of the serial number is added to the management table 1801.

As described above, the cloud server 102 uses a set of the cloud ID, serial number, and password to perform client authentication.

Figure 19:
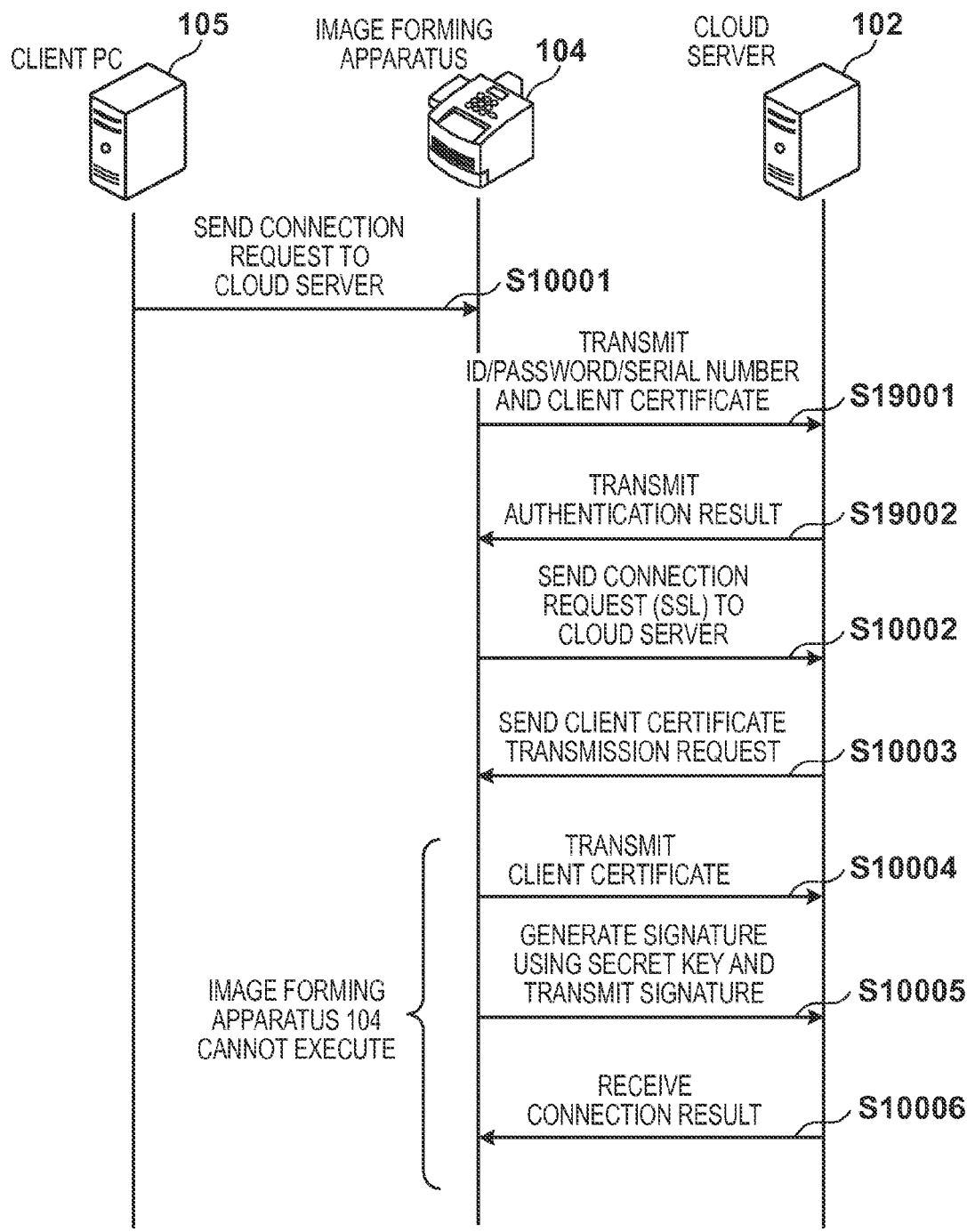
FIG. 19 is a sequence chart for explaining a procedure when the image forming apparatus connects to the cloud server in a network system according to the second embodiment of the present invention.

FIG. 19 is a sequence chart for explaining a procedure when the image forming apparatus 104 connects to the cloud server 102 in a network system according to the second embodiment of the present invention. Note that, in FIG. 19, the same reference symbols as those in FIG. 10 of the above-described first embodiment denote the same processes and a description thereof will be omitted.

Referring to FIG. 19, processes in steps S19001 and S19002 are added to the client server connection procedure in steps S10001 to S10006 shown in FIG. 10 between steps S10001 and S10002.

Figures 20, 21:
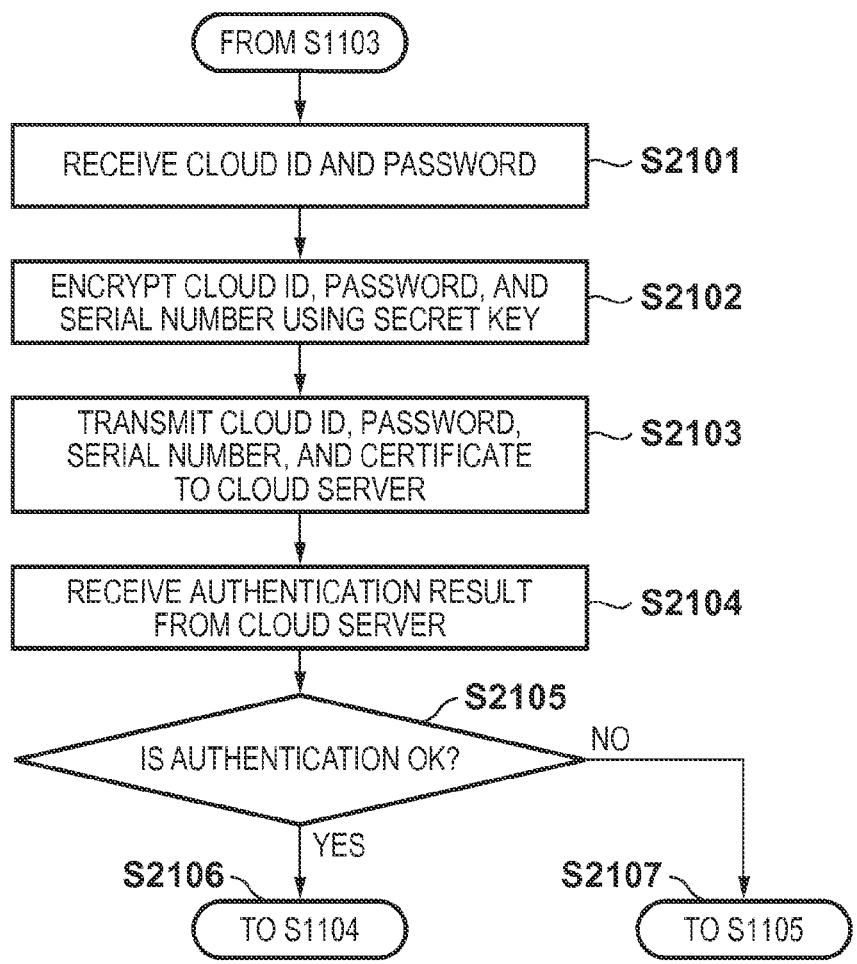
FIG. 20 depicts a view showing a screen example for instructing to start connection to the cloud server on a client PC according to the second embodiment.
FIG. 21 is a flowchart for describing a part of processing executed by the image forming apparatus according to the second embodiment.

In this example, when connecting to the cloud server 102, a screen shown in FIG. 20 is used to input a cloud ID and password in a client PC 105, and the image forming apparatus 104 receives the cloud ID and password. This causes the controller 305 of the image forming apparatus 104 to read out a serial number 310 from an FRAM 206 and a certificate 311 from the HDD 204. The image forming apparatus 104 encrypts the serial number 310, cloud ID, and password using a secret key 308, and transmits the encrypted information and the certificate 311 to the cloud server 102 (step S19001). After that, the cloud server 102 receives and decrypts the serial number 310, cloud ID, and password, and performs authentication for the image forming apparatus. In step S19002, the cloud server 102 transmits the authentication result to the image forming apparatus 104.

If authentication for the image forming apparatus succeeds, processing in steps S10002 to S10006 is executed. In the case of the image forming apparatus 104, in step S19002, the cloud server 102 sends a notification that authentication has failed. In this case, the processing in steps S10002 to S10006 is not executed between the image forming apparatus 104 and the cloud server 102.

FIG. 20 depicts a view showing a screen example for instructing to start connection to the cloud server 102 in the client PC 105 according to the second embodiment.

To connect to the cloud server 102, the user inputs a cloud ID and password to request connection to the cloud server.

FIG. 21 is a flowchart for describing a part of processing executed by the image forming apparatus 104 according to the second embodiment. This processing indicates processing added between steps S1103 and S1104 of FIG. 11.

In this processing, in step S2101, the controller 305 reads out the serial number 310 from the FRAM 206 and the certificate 311 from the HDD 204, and receives the input cloud ID and password. The process advances to step S2102, and the key manager 307 encrypts the serial number 310, cloud ID, and password using the secret key 308. The process advances to step S2103, and the transmitter 303 transmits the encrypted information and the certificate 311 to the cloud server 102.

Figure 22:
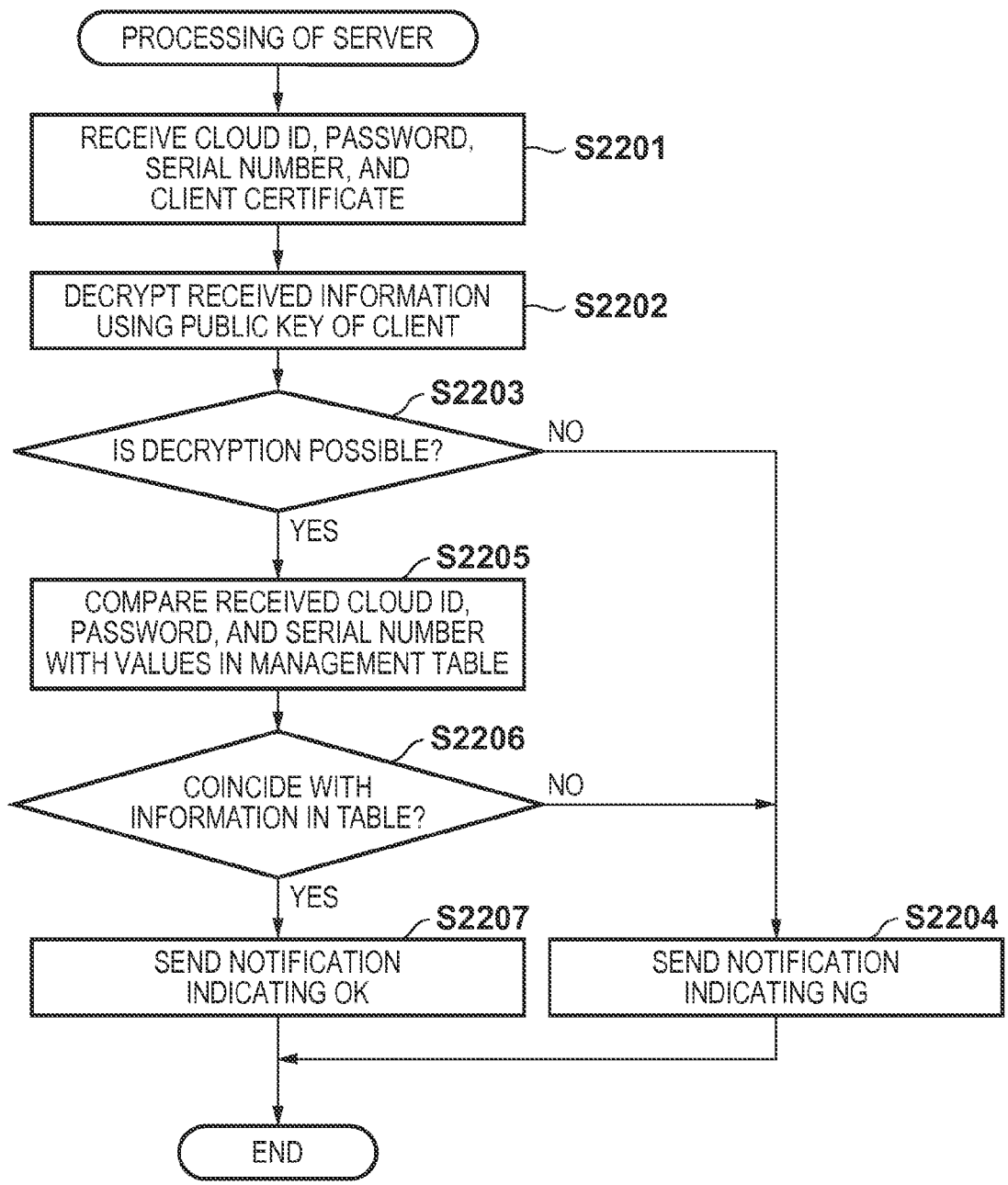
FIG. 22 is a flowchart for describing processing of the cloud server in connection according to the second embodiment.

FIG. 22 is a flowchart for describing processing of the cloud server 102 in connection according to the second embodiment. Note that a program for executing the processing shown in FIG. 22 is deployed on the RAM 1303 upon execution, and executed under the control of the CPU 1301.

This processing starts when the image forming apparatus transmits the above-described encrypted information and certificate 311 to the cloud server 102 in step S2103 of FIG. 21. In step S2201, the receiver 1402 receives the certificate and the encrypted cloud ID, password, and serial number. The process advances to step S2202, and the authentication section 1404 decrypts the encrypted information using the public key of the certificate. In step S2203, the CPU 1301 determines whether it is possible to decrypt the information. If it is impossible to decrypt the information, the process advances to step S2204 and the server notifies the image forming apparatus of NG, thereby terminating the process.

On the other hand, if decryption has succeeded, the process advances to step S2205, and the CPU 1301 compares the received cloud ID, password, and serial number with information in the management table 1801. In step S2206, the CPU 1301 determines whether the pieces of information coincide with each other. If the pieces of information coincide with each other, the process advances to step S2207 and the server notifies the image forming apparatus of OK, thereby terminating the process. On the other hand, if the pieces of information do not coincide with each other, the process advances to step S2204 and the server notifies the image forming apparatus of NG indicating that connection has been rejected, thereby terminating the process. In the above description, the received cloud ID and serial number are compared with the information in the management table 1801 (in steps S2205 and S2206) and the image forming apparatus is notified OK or NG (S2207 or S2204) based on whether or not they are coincide, but the present invention is not limited to this. For example, in steps S2205 and S2206, the following process may be executed. In steps S 2205 and S2206, the CPU 1301 compares the received cloud ID and serial number with the cloud ID and the serial number included in the certificate transmitted in step S 1108 or S2103, and the process proceeds to step S 2207 or S2204 based on whether or not they are coincide.

With this processing, the image forming apparatus receives the authentication result from the cloud server 102 in step S2104 of FIG. 21. The process then advances to step S2105 and the CPU 201 determines the authentication result. If it is determined that authentication has succeeded, the process advances to step S2106, that is, step S1104 of FIG. 11 to execute the same processing as that in the above-described first embodiment. On the other hand, if it is determined in step S2105 that authentication has failed, the process advances to step S2107, that is, step S1105 of FIG. 11 to stop the connection processing to the cloud server 102.

According to the second embodiment, even if an attacker steals the secret key 308, public key 309, and certificate 311 of the image forming apparatus 101 and the image forming apparatus 104 storing the stolen information tries to access the cloud server 102, the cloud server 102 cannot authenticate the image forming apparatus 104. This prevents the image forming apparatus 104 from accessing the cloud server 102 to use the service provided by the cloud server 102, and also prevents the user information of the image forming apparatus 101 from leaking.

Note that the cloud server 102 of the second embodiment compares the received serial number and cloud ID with the information registered in the cloud server 102 to determine whether the pieces of information coincide with each other. However, the present invention is not limited to this. For example, it may be determined whether the pieces of information coincide with each other by comparing a hash value obtained by combining information held in the client certificate with that obtained by combining the information held in the cloud server 102.

As described above, according to the second embodiment, the cloud server also performs client authentication processing in addition to the configuration of the first embodiment. Therefore, even if information unique to the device included in the image forming apparatus does not coincide with information unique to the device included in the client certificate, the cloud server can detect it. With this configuration, it is possible to obtain an effect of solving the problem that a third party who stole the client certificate, private key, and public key can spoof to access the cloud server.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD))BD)he present invention can also be realized by a compu While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-043421, filed Mar. 5, 2013, which is hereby incorporated by reference herein in its entirety.

What is claimed is:

1. An information processing apparatus that communicates with a server via a network, comprising:
   a hardware processor; and
   a first memory, which is not detachable from the information processing apparatus, that stores identification information of the information processing apparatus and a program that is executed by the hardware processor and causes the hardware processor to perform the functions of:
      a request unit that transmits an issuance request that requests a certificate necessary to connect to the server, including the identification information of the information processing apparatus stored in the first memory, to a certificate authority;
      a reception unit that receives the certificate, including the identification information of the information processing apparatus, issued by the certificate authority in accordance with the issuance request;
   a second memory that stores the certificate received by the reception unit, the second memory being detachable from the information processing apparatus;
   a determination unit that determines whether or not the identification information of the information processing apparatus stored in the first memory corresponds to the identification information included in the certificate stored in the second memory; and
   a connection control unit that controls the information processing apparatus to:
      (i) transmit a connection request to the server in accordance with the determination unit having determined that the identification information stored in the first memory corresponds to the identification information included in the certificate stored in the second memory, and
      (ii) restrict transmission of the connection request to the server in accordance with the determination unit having determined that the identification information stored in the first memory does not correspond to the identification information included in the certificate stored in the second memory.

2. The apparatus according to claim 1, wherein the certificate is a client certificate.

3. The apparatus according to claim 1, wherein the identification information includes at least one of a device serial number, a MAC address, and an IP address of the information processing apparatus.

4. The apparatus according to claim 1, further comprising a third memory that stores a secret key and a public key corresponding to the secret key, the third memory being detachable from the information processing apparatus,
   wherein the transmission unit transmits the issuance request including the public key stored in the third memory to the certificate authority.

5. The apparatus according to claim 1, further comprising an input unit that inputs a parameter necessary for the issuance request,
   wherein the transmission unit transmits the issuance request including the parameter input by the input unit to the certificate authority.

6. The apparatus according to claim 5, wherein the input unit transmits screen information for displaying a screen for inputting the parameter to another information processing apparatus, and inputs the parameter by receiving parameter input through the screen in the other information processing apparatus.

7. A method of controlling an information processing apparatus that communicates with a server via a network, the method comprising:
   storing identification information of the information processing apparatus in a first memory that is not detachable from the information processing apparatus;
   transmitting an issuance request that requests a certificate necessary to connect to the server, including the identification information unique to the information processing apparatus stored in the first memory, to a certificate authority;
   receiving the certificate, including the identification information of the information processing apparatus, issued by the certificate authority in accordance with the issuance request;
   storing the certificate received in the receiving in a second memory that is detachable from the information processing apparatus;
   determining whether or not the identification information of the information processing apparatus stored in the first memory corresponds to the identification information included in the certificate stored in the second memory; and
   controlling the information processing apparatus to:
      (i) transmit a connection request to the server in accordance with a determination in the determining that the identification information stored in the first memory corresponds to the identification information included in the certificate stored in the second memory, and
      (ii) restrict transmission of the connection request to the server in accordance with a determination in the determining that the identification information stored in the first memory does not correspond to the identification information included in the certificate stored in the second memory.

8. A non-transitory computer-readable storage medium storing a program for causing a computer to execute a method comprising:
   storing identification information of an information processing apparatus in a first memory that is not detachable from the information processing apparatus;
   transmitting an issuance request that requests a certificate necessary to connect to a server, including the identification information of the information processing apparatus stored in the first memory, to a certificate authority;
   receiving the certificate, including the identification information of the information processing apparatus, issued by the certificate authority in accordance with the issuance request;
   storing the certificate received in the receiving in a second memory that is detachable from the information processing apparatus;
   determining whether or not the identification information of the information processing apparatus stored in the first memory corresponds to the identification information included in the certificate stored in the second memory; and
   controlling the information processing apparatus to:
      (i) transmit a connection request to the server in accordance with a determination in the determining that the identification information stored in the first memory corresponds to the identification information included in the certificate stored in the second memory, and (ii) restrict transmission of the connection request to the server in accordance with a determination in the determining that the identification information stored in the first memory does not correspond to the identification information included in the certificate stored in the second memory.

9. The apparatus according to claim 4, wherein the hardware processor further performs the functions of:
  a first transmission unit that transmits the certificate stored in the second memory to the server in response to a transmission request for transmitting the certificate from the server, in a case that the connection control unit transmits the connection request to the server; and
  a second transmission unit that transmits a signature generated using the secret key stored in the third storage unit to the server.

10. The apparatus according to claim 1, wherein the hardware processor further performs the function of a notification unit that notifies a user of a connection failure with the server in a case that the connection control unit restricts transmission of the connection request to the server.

\* \* \* \* \*